United States Patent [19]

Kosco

[11] 3,886,302

[45] May 27, 1975

[54] CLOSED CIRCUIT TELEVISION MODEM SHARING SYSTEM

[75] Inventor: Thomas J. Kosco, Harbor City, Calif.

[73] Assignee: Hughes Aircraft Company, Culver City, Calif.

[22] Filed: Jan. 28, 1974

[21] Appl. No.: 437,410

[52] U.S. Cl. .......... 178/5.1; 325/308; 178/DIG. 13

[51] Int. Cl. .......... H04n 1/44

[58] Field of Search .......... 325/308; 178/5.1, DIG. 13

[56] References Cited

UNITED STATES PATENTS

| | | | |
|---|---|---|---|
| 3,786,424 | 1/1974 | McVoy et al. | 178/DIG. 13 |
| 3,790,700 | 2/1974 | Callais et al. | 178/5.1 |
| 3,798,548 | 3/1974 | White et al. | 178/DIG. 13 |
| 3,806,814 | 4/1974 | Forbes | 178/DIG. 13 |

*Primary Examiner*—Maynard R. Wilbur
*Assistant Examiner*—S. C. Buczinski
*Attorney, Agent, or Firm*—W. H. MacAllister; Martin E. Gerry

[57] ABSTRACT

A system for controlling CATV program viewing in a plurality of modes of operation. In a first mode of operation, a downstream digital transmission causes control means to develop first binary data for comparison in a comparator with selected-channel code data from channel means to enable a first circuit to allow a first or second category program to be selected and received by a subscriber during a predetermined temporary period of time. In a second mode of operation the enabling of a second circuit by the subscriber will only cause the control means to be enabled if the subscriber is authorized to receive that selected first category program. In a third mode of operation the enabling of the second circuit by the subscriber will enable a third circuit to allow a selected second category program to be received. In a fourth mode of operation the selection of a third category program by the subscriber will enable a fourth circuit to allow that selected third category program to be received. MODEM sharing networks are provided in the cable system interconnecting a local processing center and the various subscriber terminals. Each MODEM sharing network has modulation and demodulation circuitry, and ability to handle about twelve subscriber terminals.

8 Claims, 10 Drawing Figures

Fig. 3.
| Channel Code | | | | | Status | Decoder 59 Output | | | | | | | |
|---|---|---|---|---|---|---|---|---|---|---|---|---|---|
| A | B | C | D | E | | 61 | 62 | 63 | 64 | 65 | 66 | 67 | 68 |
| 0 | 0 | 0 | 0 | 0 | Restricted | 1 | 0 | 0 | 0 | 0 | 0 | 0 | 0 |
| 0 | 0 | 0 | 0 | 1 | Restricted | 0 | 1 | 0 | 0 | 0 | 0 | 0 | 0 |
| 0 | 0 | 0 | 1 | 0 | Premium | 0 | 0 | 1 | 0 | 0 | 0 | 0 | 0 |
| 0 | 0 | 0 | 1 | 1 | Premium | 0 | 0 | 0 | 1 | 0 | 0 | 0 | 0 |
| 0 | 0 | 1 | 0 | 0 | Premium | 0 | 0 | 0 | 0 | 1 | 0 | 0 | 0 |
| 0 | 0 | 1 | 0 | 1 | Premium | 0 | 0 | 0 | 0 | 0 | 1 | 0 | 0 |
| 0 | 0 | 1 | 1 | 0 | Premium | 0 | 0 | 0 | 0 | 0 | 0 | 1 | 0 |
| 0 | 0 | 1 | 1 | 1 | Premium | 0 | 0 | 0 | 0 | 0 | 0 | 0 | 1 |
Fig. 4.
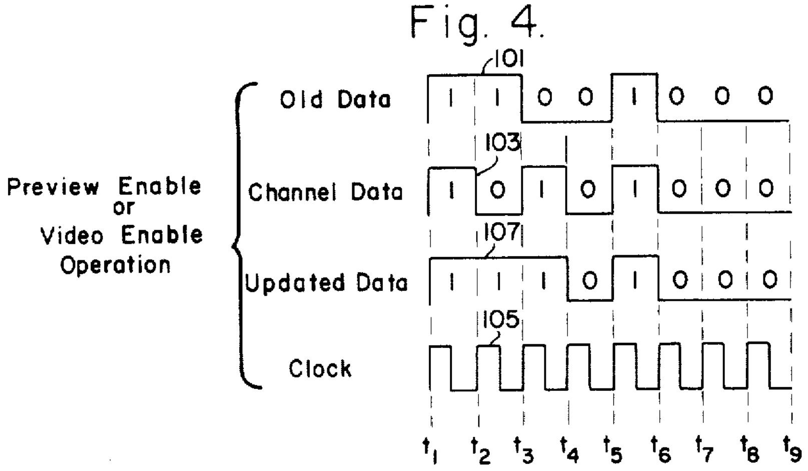
Fig. 5.
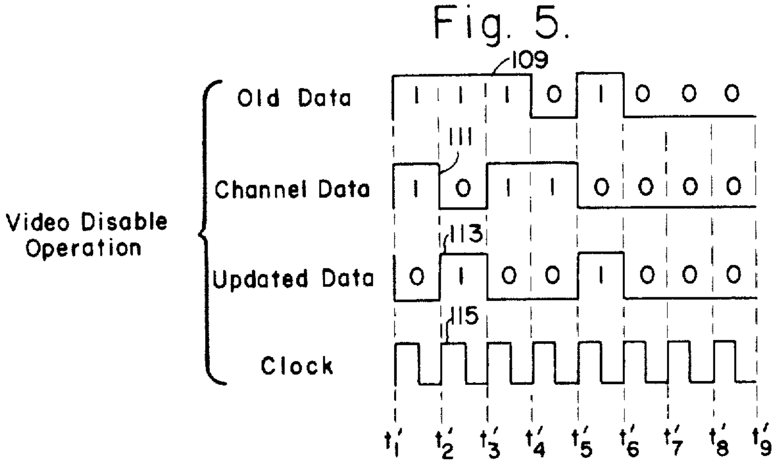

CLOSED CIRCUIT TELEVISION MODEM SHARING SYSTEM

BACKGROUND OF THE INVENTION

This invention relates to CATV systems and particularly to a system for controlling CATV program viewing in several modes of operation having a common MODEM sharing network for a plurality of subscriber terminals.

Although the term "CATV," as used herein, originally meant Community Antenna Television it has come to represent a much broader field of communications. Within the past decade additional services have been proposed and in some cases actually provided by some CATV systems operators. In the realm of one-way communicatinos (i.e., from a central transmitter to the subscribers), services such as AM and FM radio programs, weather broadcasts and locally originated television programs have been provided as part of the CATV services. With the availability of two-way cable distribution networks a vast number of additional communications needs can be served. The availability of upstream communications channels allows the subscribers of a CATV system to be surveyed or polled for viewing habits or billing and, in addition, allows the subscribers to obtain services which are unrelated to television. Therefore, although the term "CATV" is used herein it should be noted that the term includes two-way communications on a much broader scale but which retains television programming as an important function.

In the past, many systems have been proposed for selectively transmitting various television programs to subscribers. In one type of system a transmitting station utilizes a coder unit to scramble the video and sound of the television programs so that conventional television receiver cannot receive an intelligible signal. The signal being received is so distorted or jittered that it cannot be viewed normally. However, when the television receiver is equipped with a decoder to unscramble the coded signal, normal video and sound can be received. The use of the decoder to unscramble the coded signal is generally recorded for billing the subscriber at some later time.

In a second type of system, a transmitting station furnishes each of its subscribers with a list of films which it possesses, with each film having a specific selecting signal. Upon selecting a film from the list, a subscriber actuates a control which turns on his television set and searches for a free channel on one of a plurality of cables connected to a distribution box which is coupled between the subscriber's location and the transmitting station. When a free channel is found, a signal informs the subscriber that he is connected with the transmitting station through a free channel which has been located. At that time the subscriber actuates a selector control which transmits through the free channel of the cable complex to the transmitting station a signal corresponding to the film which the subscriber has selected. The station then automatically selects the required film, starts this film and causes a high frequency transmitter to transmit the television program via the free channel to the subscriber's television set. At the completion of the program, the transmission stops automatically and the television receiver is switched off automatically.

In a third type of system a private coaxial distribution network allows a transmitting station network to simultaneously transmit a plurality of unscrambled subscription television (TV) programs to each of a plurality of subscribers. EAch subscriber has a five-position switch on a special converter, which is coupled to the coaxial network and to the subscriber's television antenna. In one position of the converter switch, free television is received via the subscriber's television antenna in a conventional manner. In a second position of the converter switch, voice and music can be received through the loudspeaker of the subscriber's TV set via the cable distribution network. In each of the last three positions of the converter switch, a different pay television channel can be received. It is important to note that the only television programs utilized in this system are pay television programs, since the coaxial network is effectively disconnected if the subscriber wants to receive free TV programs from his antenna. A response code, indicating the position of the converter switch, is sent back to the transmitting station so that the subscriber may be billed for watching any pay TV programs.

In a fourth type of system each of a plurality of subscribers is periodically interrogated from a central office during a preselected time slot. If a subscriber actuates a control on his subscription TV receiver set so that a channel he desires to watch may be utilized, a "yes" signal is sent back in response to the interrogation to indicate that a particular pay TV channel is being utilized or watched. A "no" response, of course, indicates that the particular pay TV channel is not being viewed. The yes responses are ultimately used to bill the subscribers.

In all of the above types of systems, some positive action by the subscriber must be undertaken to enable a pay TV program from the transmitting station or central office to be viewed by the subscriber. When the subscriber has undertaken that positive action, whether by setting up a decoder, positioning a switch or actuating a control, he will be subsequently billed for watching the selected TV program because it is a pay TV program. As a result, the above types of systems do not provide a period of time during which a pay TV program may be previewed without charge, and then automatically disabled unless the subscriber has taken the required action to see the balance of the program for a fee. Furthermore, none of the above types of systems provide restricted pay TV programs for which the subscriber must be eligible to watch, as well as be willing to pay.

None of the aforesaid systems have a common MODEM (modulator - demodulator) network as an integral portion of the cable distribution subsystem, shared among a plurality of subscriber terminals. Consequently, none of the systems make use of relatively inexpensive, ordinary telephone transmission lines for interconnection of the MODEM networks with several subscriber terminals.

SUMMARY OF THE INVENTION

Accordingly, it is a general objective of this invention to provide a common MODEM sharing network, within the cable distribution subsystem shared among a plurality of subscriber terminals. It is a further general objective of this invention to interconnect data encoders and decoders of the MODEM sharing network with ordinary telephone transmission lines and thereby reduce system cost and increase economy of operation.

Another object of this invention is to provide a system wherein at least one subscription program may be previewed without charge by the subscriber during at least one predetermined preview period.

Another object of this invention is to provide a system for allowing a restricted subscription program to be received only by members of a predetermined group of viewers.

Another object of this invention is to provide a system which will enable a subscriber to selectively receive nonrestricted subscription programs, authorized restricted subscription programs, free previews of subscription programs, and free programs.

A further object of this invention is to provide a system which enables an authorized subscriber to switch away from a previously purchased subscription program and subsequently return to it without incurring an additional charge.

Briefly, a novel system is provided for controlling CATV program viewing in a plurality of mode of operation. In a first mode of operation, control logic enables a video register to cause a first circuit to enable an output circuit to allow a subscriber to preview at least one subscription TV program during a predetermined preview period of time without charge, if the subscriber selects that program during the preview period. In a second mode of operation, the subscriber will only be allowed to receive a selected restricted subscription program, if he enables a second circuit and the control logic is enabled by a signal indicating that the subscriber is authorized to watch that restricted subscription program. In a third mode of operation, the subscriber may select a non-restricted subscription program by enabling the second circuit which, in turn, causes a third circuit to enable the output circuit to allow the non-restricted subscription program to be received. In a fourth mode of operation, the subscriber may select a free program by enabling a fourth circuit to enable the output circuit to allow the free program to be received.

The novel system includes the head end, wherein the local processing center is located, and connected by means of coaxial cable to a MODEM sharing network. The MODEM sharing network is connected by means of ordinary telephone transmission lines to a plurality of subscriber terminals for transmitting data information leaving only television channel to be transmitted on the coaxial cable through the MODEM sharing network on a preselected basis to a particular subscriber terminal.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views wherein:

FIG. 3 shows in tabular form one five-bit channel code which may be used in the control of subscription TV channels;

FIGS. 4 and 5 illustrate waveforms useful in explaining the operation of the control logic circuit 47 of FIG. 2;

DETAILED DESCRIPTION

Figure 1:
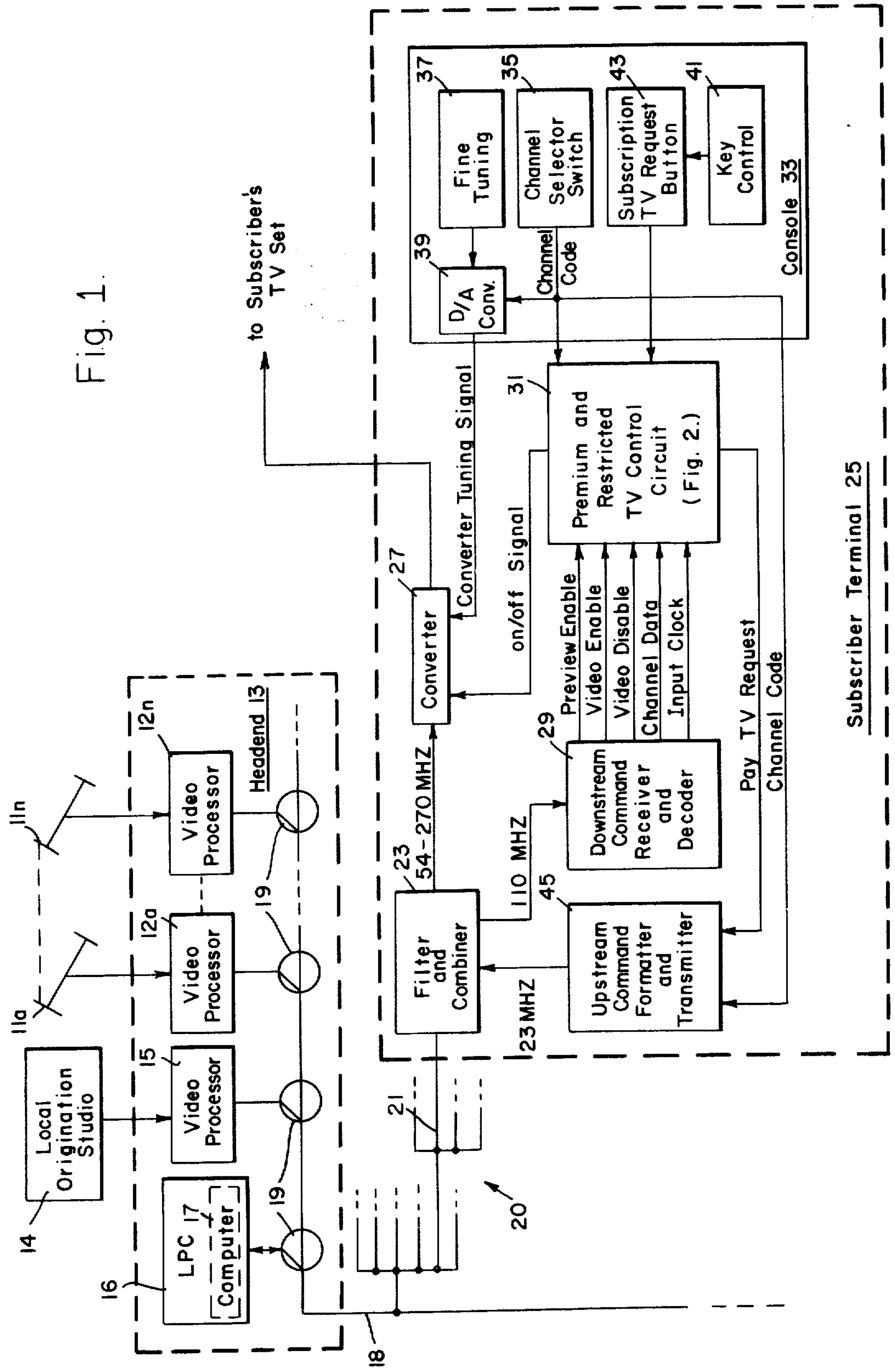
FIG. 1 is a schematic block diagram of a two-way CATV system.

Referring to the drawings, FIG. 1 discloses a two-way CATV (cable television) system which incorporates the invention. Television (TV) and radio broadcast signals transmitted through the air are received by a plurality of elevated receiving antennas 11*a* through 11*n* for subsequent processing by a plurality of video processors 12*a* through 12*n* which are located at a headend site 13. Signals from a local origination studio 14, which may be located at some distance from the headend site 13, are supplied for subsequent processing to a video processor 15 at the headend site 13. A local processing center (LPC) 16 at the headend site 13 includes a computer 17. The LPC 16 allows two-way communications between the subscribers and the headend site 13. Each of the outputs of the LPC 16 and video processors 12*a* through 12*n* and 15 is frequency multiplexed onto a main trunk line 18 with the other outputs via its associated directional coupler 19. In a downstream transmission the television and radio signals might occupy a large part of the frequency range from 54 MHz to 270 MHz, for example. A carrier centered about 110 MHz, for example, might accommodate the downstream digital data. The combined signals are transmitted downstream from the headend site 13 to a plurality of subscriber terminals. In an upstream transmission, digital data responses in, for example, the 21 to 25 MHz frequency range with a center frequency of 23 MHz and video transmissions in, for example, the 5to 21 MHz frequency range may be respectively received by the LPC 16 and video processor 15.

It is understood, of course, that the frequency ranges mentioned above are for the purpose of explanation only and should not be understood to limit the scope of the present invention. The exemplary frequencies mentioned above correspond roughly to the bandwidths of presently available commercial CATV equipment.

The downstream transmission of the video band and digital signals goes through the main trunk line 18 and is split off into a distribution network 20 until it is channeled through a cable drop line 21 into a filter and combiner circuit 23 located within a subscriber terminal 25. The filter and combiner circuit 23 separates the digital data from the video band and routes the television and radio signals to a converter 27 and the digital data to a downstream command receiver and decoder 29. The downstream command receiver and decoder 29 may include a demodulator circuit (not shown) to remove the transmitted carrier frequency, a Manchester decoder (not shown) to separate input clock pulses from a digital code, and a decoder (not shown) to extract channel data as well as any one of a group of commands such as preview enable, video enable, and video disable. The commands, channel data and input clock pulses are applied to a premium and restricted TV control circuit 31 which controls the "on" and "off" status of the converter 27. In an on condition, the converter 27 is allowed to pass a selected video channel within the video band to a subscriber's TV antenna terminals for viewing. In an off condition, the converter is disabled, thereby preventing any video from being applied to the subscriber's TV set. while the output of the converter 27 is shown and described as going to the subscriber's TV set, it should be obvious that the converter 27 may be an integral part of the subscriber's TV set rather than ancillary to it.

The operation of the premium and restricted TV control circuit 31 is controlled from a console 33 and has four modes of operation. At the console 33 a channel selector switch 35 determines which TV channel is desired by the subscriber, while a fine tuning control 37 allows for a close adjustment in the channel tuning. The channel selector switch 35 generates, for example, a five-bit channel code which is applied to the control circuit 31, as well as to a digital-to-analog (D/A) converter 39, to indicate the selected TV channel. A digital signal from the fine tuning control 37 is also applied to the D/A converter 39. The D/A converter 39 combines the digital information from the channel code and from the fine tuning control 37 and generates an analog converter tuning signal which is used to tune a varactor (not shown) in the converter 27, thereby allowing signals from the finely tuned selected channel to be applied from the converter 27 to the subscriber's TV set at a predetermined output frequency.

In a first mode operation, the computer 17 in the LPC 16 transmits a preview enable command downstream to the control circuit 31 to allow a subscription TV program to be previewed on a predetermined channel. Any subscriber may view the subscription TV program being previewed if he positions the channel selector switch 35 to that channel within the preview period. If the subscriber selects the channel in which a subscription TV program is being previewed, he will be allowed to see that TV program for a predetermined length of time without charge. If the subscriber desires to watch the completion of the previewed program, he would have to insert a key in a key control unit 41 which enables a subscription TV request button 43 to be pressed. If the subscriber presses the button 43 before, or even after, the completion of the preview period, he will be allowed to watch the rest of that premium program and will be billed accordingly. By pressing the button 43, a pay TV request signal is generated by the control circuit 31 and applied to an upstream command formatter and transmitter unit 45 to which is also applied the channel code from the channel selector switch 35. The formatter and transmitter unit 45 combines the pay TV request signal and channel code with an internally generated station address code. This combination of signals is then modulated onto the preselected upstream carrier frequency. This upstream carrier is applied through the filter and combiner unit 23 and transmitted upstream through the cable drop line 21, the distribution network 20 and the main trunk line 18 to the LPC 16 where it is processed by the computer 17. The computer 17 records the subscriber's channel address and the channel selected for billing purposes and then initiates a downstream digital transmission at the center frequency of 110 MHz which is ultimately decoded by the receiver and decoder unit 29 as a video enable command. This video enable command confirms that the subscriber has been billed and allows the control circuit 31 to keep the converter 27 turned on after the termination of the preview period if the pay TV request was made before the completion of the preview period, or turns on the converter 27 if the pay TV request was made after the termination of the preview period.

In a second mode of operation, the subscriber may initiate a request to receive a restricted category subscription program. This is accomplished at the console 33 by the subscriber inserting his key in the key control circuit 41 and pressing the subscription TV request button 43 which enables the control circuit 31 to generate the pay TV request signal. However, the subscriber will not be immediately allowed to receive the restricted program. The pay TV request signal will be sent upstream to the LPC 16, and the computer 17 will search its memory to see if the subscriber is one of the persons on its restricted list of persons authorized to receive the requested program. Restricted lists, for example, may be respectively composed of groups of doctors, groups of lawyers, or other groups of subscribers sharing a common interest. Restricted programs therefore might comprise programs of interest to only those selected groups of persons. For example, a medical operation may be only useful to doctors; lectures on legal strategies, developments or training courses would only be of interest to the legal profession; or police tactics, such as criminal detection techniques or riot or crowd control, would only be of interest to law enforcement officers. In the event the computer 17 finds the terminal address of the subscriber on its restricted authorized viewer list for that type of program, it will transmit downstream to the subscriber terminal 25 a video enable command which will allow the control circuit 31 to process the channel data so that the converter 27 is placed in an on condition to allow the subscriber to receive the restricted program. Of course, if the subscriber's terminal address is not on the computer's authorized viewer list, no video enable command is sent to the subscriber terminal 25. Under this mode of operation therefore, only previously authorized persons can receive restricted category programs.

In a third mode of operation, a subscriber can gain immediate access to a nonrestricted category subscription program by inserting his key in the key control circuit 41 and pressing the subscription TV request button 43. This operation will enable the control circuit to immediately turn on the converter 27 and therefore allow the selected nonrestricted subscription program to be received without delay. As described in the second mode of operation, the depression of the subscription TV request button 43 enables the control circuit 31 to generate a pay TV request signal which is transmitted upstream to the LPC 16. Since a nonrestricted program is selected by the subscriber, the LPC 16 will automatically send, during its subsequent operation, a video enable signal to confirm the billing and to keep the converter 27 turned on. It should be noted that the subscriber will still receive the nonrestricted subscription program even if a video enable signal is not transmitted from the LPC 16.

The computer 17 causes the LPC 16 to send a video disable signal to the control circuit 31 to turn the converter 27 off at the completion of the restricted category program of the second mode of operation; at the completion of the nonrestricted category program of the third mode of operation; or at the completion of the preview period of the first mode of operation, if the subscriber has not actuated the key control 41 and request button 43 within the preview period. It should be noted at this time that both restricted energy category or nonrestricted category programs may be previewed during the first mode of operation.

In a fourth mode of operation, if the channel selector switch 35 is positioned to receive a nonsubscription category TV program, or free TV program, the channel code will enable the control circuit 31 to generate an on control signal to turn the converter 27 on, so that the selected free TV program may be received at the subscriber's TV set.

Figure 2:
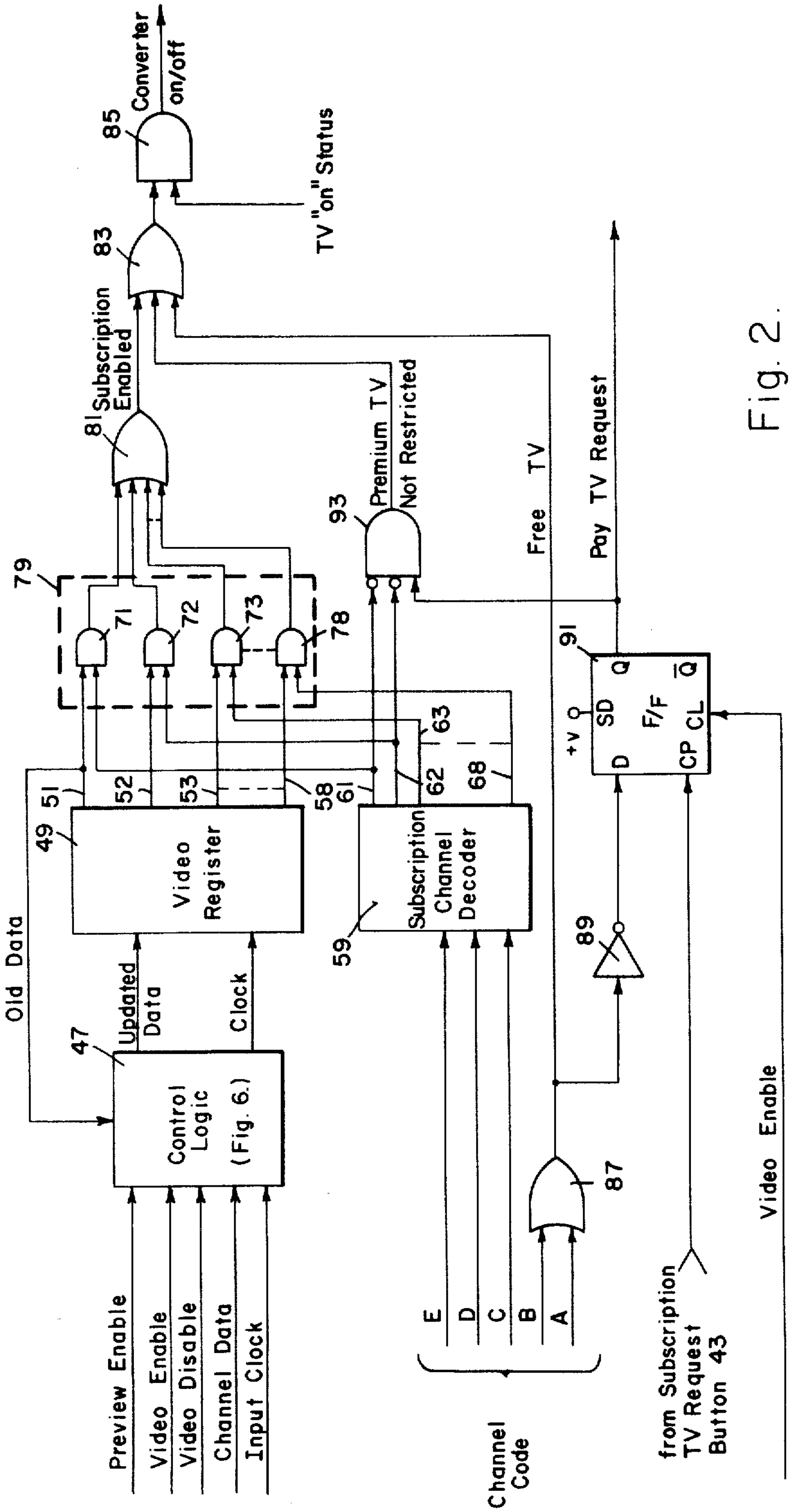
FIG. 2 is a schematic block diagram of the premium and restricted TV control circuit of FIG. 1.

The premium and restricted TV control circuit 31 will now be more fully discussed by referring to FIG. 2. In FIG. 2, the channel data, input clock pulses, and one of the preview enable, video enable, and video disable commands are applied to a control logic circuit 47 to initiate the operation of the control circuit 31. The control logic 47 applies clock pulses along with a serial stream of, for example, eight bits of updated data to a video register 49. The video register 49 may be a shift register containing eight flip-flops (not shown). Each of the eight flip-flops stores one bit of the eight-bit updated data in order to produce eight outputs, 51 through 58. This video register 49 stores information as to which subscription TV channels have been enabled for viewing, either via a preview enable command in the first mode of operation or a video enable command in the second or third mode of operation.

When the subscriber positions the channel selector switch 35 to a channel, a five-bit channel code A, B, C, D, E is generated. When the subscriber has selected a subscription TV channel, which may either be restricted or nonrestricted, both A and B are in a binary 0 state or condition. The C, D and E portion of the channel code is applied to a subscription channel decoder 59 which, for example, can be similar to the decoders/demultiplexers discussed from page 9-160 to 9-166 of The Integrated Circuits Catalog for Design Engineers, First Edition, of Texas Instruments, Inc. The subscription channel decoder 59 converts the three binary bits C, D and E to eight output lines 61 through 68. When A and B are both in binary 0 states, the output lines 61 through 68 of the decoder 59 represent the subscription restricted or premium channel that the subscriber has selected with the channel selector switch 35.

One example of a channel code A, B, C, D, E which may be used to control the selection of restricted and premium subscription channels is illustrated in FIG. 3. When A and B are both in binary 0 states, the output lines 61 through 68 of the decoder 59 represent the restricted or premium subscription channel that the subscriber has selected. At this time, a 1 state at any of the outputs 61 through 68 indicates that a subscription, and not a free, channel has been selected by the subscriber. A 1 state from either of the outputs 61 or 62 designates the selection of a restricted channel. A 1 state from any of the outputs 63 through 68 designates the selection of a premium, or nonrestricted channel.

The outputs 51 through 58 of the video register 49 are respectively compared with the outputs 61 through 68 of the subscription channel decoder 59 in respective AND gates 71 through 78 contained in a channel comparator 79. Each of the AND gates 71 through 78 in the comparator 79 has its output coupled to a different input of an OR gate 81. When the channel selected by the subscriber is one of the enabled channels stored in the video register 49, the AND gate in the comparator 79 associated with the selected and enabled channel develops a binary 1 output which is applied through the OR gate 81, then through another OR gate 83 to one input of an AND gate 85. A second input to the AND gate 85 is a TV on status signal from the subscriber's TV set, which is in a 1 state when the TV set is on, and in a 0 state when the TV set is off. The output of the AND gate 85 is the on/off signal that controls the on/-off status of the converter 27 (FIG. 1). A 1 output from the AND gate 85 turns on the converter 27, while a 0 output from the AND gate 85 turns off the converter 27. It is therefore obvious that the converter will be turned off when the subscriber's TV set is turned off.

If, for example, the subscriber has selected that channel which causes the output 63 to go to a 1 state, the AND gate 73 will produce a 1 state output if the output 53 from the video register 49 is in an enabled 1 state. The 1 state output of the AND gate 73 will then be passed sequentially through the OR gates 81 and 83 and to the AND gate 85 to turn on the converter 27.

In the fourth mode of operation, if the channel selected by the subscriber is such that either the A or B portion of the channel code is in a 1 state, OR gate 87 will be enabled to provide a 1 state signal which will be sequentially passed through the OR gate 83 and AND gate 85 to enable the converter 27 so that the selected free channel may be received by the subscriber. In either the second or third mode of operation, both the A and B portions of the channel code are in a 0 state, thereby preventing the OR gate 87 from causing the converter 27 to be turned on.

In the second mode of operation, when the channel selected by the subscriber is a restricted channel, one of the restricted outputs 61 or 62 of the decoder 59 will change to a 1 state. If this restricted channel has not been previously enabled via the video register 49, the comparator 79 will not enable the OR gate 81 to develop a subscription enable signal. As a result, the uppermost input of the OR gate 83 will be in a 0 state. In addition, as specified before, the selection of a subscription channel will cause the A and B signals to both be in a 0 state. As a result, the OR gate 87 will develop a 0 state output which is applied to the lowermost input of the OR gate 83. The 0 state output of the OR gate 87 will also be inverted by an inverter 89 and applied to the D input of a D flip-flop 91. When the subscriber depresses the subscription TV request button 43 on the console 33, a 1 state output is applied to the CP (clock pulse) input of the flip-flop 91 which causes its Q output to go to a 1 state. The Q output of the flip-flop 91 is applied to the lower input of an AND gate 93. The inverted upper two inputs of the AND gate 93 are coupled to the restricted outputs 61 and 62 of the subscription channel decoder 59. If the subscriber had selected a subscription TV channel which was not restricted, the outputs 61 and 62 would both be in 0 states and the AND gate 93 would produce a "premium TV, not restricted" enabling signal which would be sequentially passed through the OR gate 83 and AND gate 85 to turn on the converter 27. However, it was specified that the subscriber had selected one of the two restricted channels such that either output 61 or outputs 62 is in a 1 state. Assume that the restricted channel selected is such as to place the output 62 in a 1 state. That 1 state output 62, which is inverted at the input of the AND gate 93, will disable the AND gate 93 and prevent that restricted channel from being immediately viewed, even though a pay TV request signal had been generated.

The pay TV request signal will be placed on an upstream transmission in the manner previously described and received by the LPC 16, and the associated restricted list searched by the computer 17. Assuming that the computer 17 finds the terminal address on its restricted list, it will cause a video enable signal to be transmitted downstream and processed by the control logic 47 such that the video register 49 will now develop a 1 state at its output 52 to indicate that the selected restricted channel is now enabled. The 1 state outputs 52 and 62, will not enable the AND gate 72 to generate a 1 state signal which is sequentially passed through the OR gates 81 and 83 and the AND gate 85 to turn on the converter 27 to enable the selected restricted channel to be received. At the same time that the video enable command is applied to the control logic 47, it is applied to the CL (clear) input of the flip-flop 91 to cause the Q output of the flip-flop 91 to change to a 0 state. By this means, the AND gate 93 is prevented from allowing any other subscription TV channel from being selected and viewed without the subscription TV request button 43 being pressed again. Of course, any other channel that remains in an enabled condition, as stored in the video register 49, can still be enabled for viewing, but via the OR gate 81 rather than the AND gate 93.

In the third mode of operation, the selection of a nonrestricted subscription TV channel will disable the OR gate 87 by applying two 0 state inputs thereto. Furthermore, the outputs 61 and 62 of the subscription channel decoder 59 will both be 0 states, which are inverted at the upper two inputs of the AND gate 93. The depression of the subscription TV request button 43 will cause the Q output of the flip-flop 92 to apply a 1 to the lowest input of the AND gate 93. The AND gate 93 will therefore be enabled to apply a 1 signal through the OR gate 83 and AND gate 85 to turn on the converter 27. In the meantime, the 1 output from the Q side of the flip-flop 91, or pay TV request signal, is transmitted upstream to the LPD 16 for billing purposes. A video enable signal is subsequently received at the subscriber terminal 25, as described previously, which causes the video register 49 to store and indicate at its output the fact that the selected nonrestricted, subscription channel has been enabled. The comparator 79 compares the enabled channel signal from the video register 49 with the selected channel signal from the decoder 59 and causes a 1 output therefrom to be passed through the OR gates 81 and 83 to keep the converter in an on condition. As explained previously, the video enable signal also clears the flip-flop 91, causing its Q output to change to a 0 state, thereby disabling the AND gate 93. This third mode of operation gives the subscriber immediate access to a selected nonrestricted subscription program via the "premium TV, not restricted" enabling signal from the AND gate 93, which is used to turn on the converter 27. Upon receipt of the video enable signal a new route for the enabling signal through the OR gate 81 is opened and the route through the AND gate 93 is closed.

In the first mode of operation, the computer 17 in the LPC 16 automatically, without any action by the subscriber, generates a preview enable signal. This preview enable signal is automatically processed by the control logic 47 to supply updated data to the video register. As a result, the video register 49 stores information as to the channel which is being previewed. If the subscriber positions his channel selector switch 35 to that channel being previewed, the comparator 79 will generate an enabling signal which will be sequentially passed through the OR gates 81 and 83 and the AND gate 85 to turn on the converter 27. The subscriber may then watch, without charge, the program being previewed.

Each time that channel data and input clock pulses are applied to the control logic 47, the output 51 of the video register 49 is also applied to the control logic 47. The first bit stored in the register 49, now at the output 51, is applied as old data to the control logic 47 for comparison with the first bit of the incoming channel data at an input clock pulse time. During the second input clock pulse time, a bit of updated data is entered into the register 49, causing the output 58 to correspond thereto, and at the same time the bit that had been stored at the output 52 is now shifted up to the output 51 for comparison with the second bit of the channel data. In this manner, updated data is serially shifted into the register 49 at the same time that old data is serially shifted out for comparison with the channel in the control logic circuit 47. It should be noted that old data and channel data are only compared in the control logic circuit 47 when a peview enable, video enable or video disable command is received. Reference will now be made to FIGS. 4 and 5 to further explain the manner in which the old data is compared with the channel data to produce updated data.

In FIG. 4, either a preview enable or a video enable operation is illustrated through waveshapes. Assume that the old data, represented by the waveform 101, consists of the binary number 11001000. Further assume that the incoming channel data, represented by the waveform 103, has the binary number 10101000. The eight clock pulses, which occur only after one of the preview enable, video enable and video disable commands, are represented by the waveform 105 and are respectively initiated at the times $t_1$ through $t_8$, with the eighth clock pulse terminating at time $t_9$. After receiving either the preview enable or the video enable command it is necessary to cause the video register 49 to store a signal (or signals) indicative of the channel (or channels) newly enabled without changing the status of the previously enabled channels. As a result, the updated data, represented by the waveform 107, is in a 1 state any bit time that the old data is in a 1 state at a clock pulse time, regardless of the state of the input channel data. This is illustrated by comparing the first and second bits of each of the waveforms 101 and 103 with the first and second bits of the waveform 107, which respectively occur during the periods $t_1 - t_2$ and $t_2 - t_3$. It therefore follows that whenever a bit of the old data is in a 0 state condition, the corresponding updated data will only develop a 1 state when the channel data is in a 1 state. This is illustrated by comparing the third and fourth bits of each of the old data and channel data with the updated data, which occur during the clock periods $t_3 - t_4$ and $t_4 - t_5$. The remaining four bits of the waveforms 101, 103 and 107 follow the operation previously described.

In a video disable operation it is required that whenever any bit of the channel data is in a 1 state, any corresponding 1 state bit of old data be changed to a bit of 0 state updated data in order to prevent that channel from being viewed. This operation results after the end of a preview period if the subscriber has not caused a pay TV request signal to be generated by the control logic 31, or at the completion of a premium or restricted subscription TV program. The waveforms 109, 111, 113 and 115 in FIG. 5 respectively represent the old data, channel data, updated data and clock pulses which occur during the period $t_1' - t_2'$ through $t_8' - t_9'$. As can be readily seen in FIG. 5, whenever a bit of channel data is in a 1 state, the corresponding bit of updated data is in a 0 state to prevent subsequent viewing of that channel; and whenever a bit of the channel data is in a 0 state, the corresponding bit of updated data remains in the same state as the corresponding bit of old data at that clock pulse time.

Figure 6:
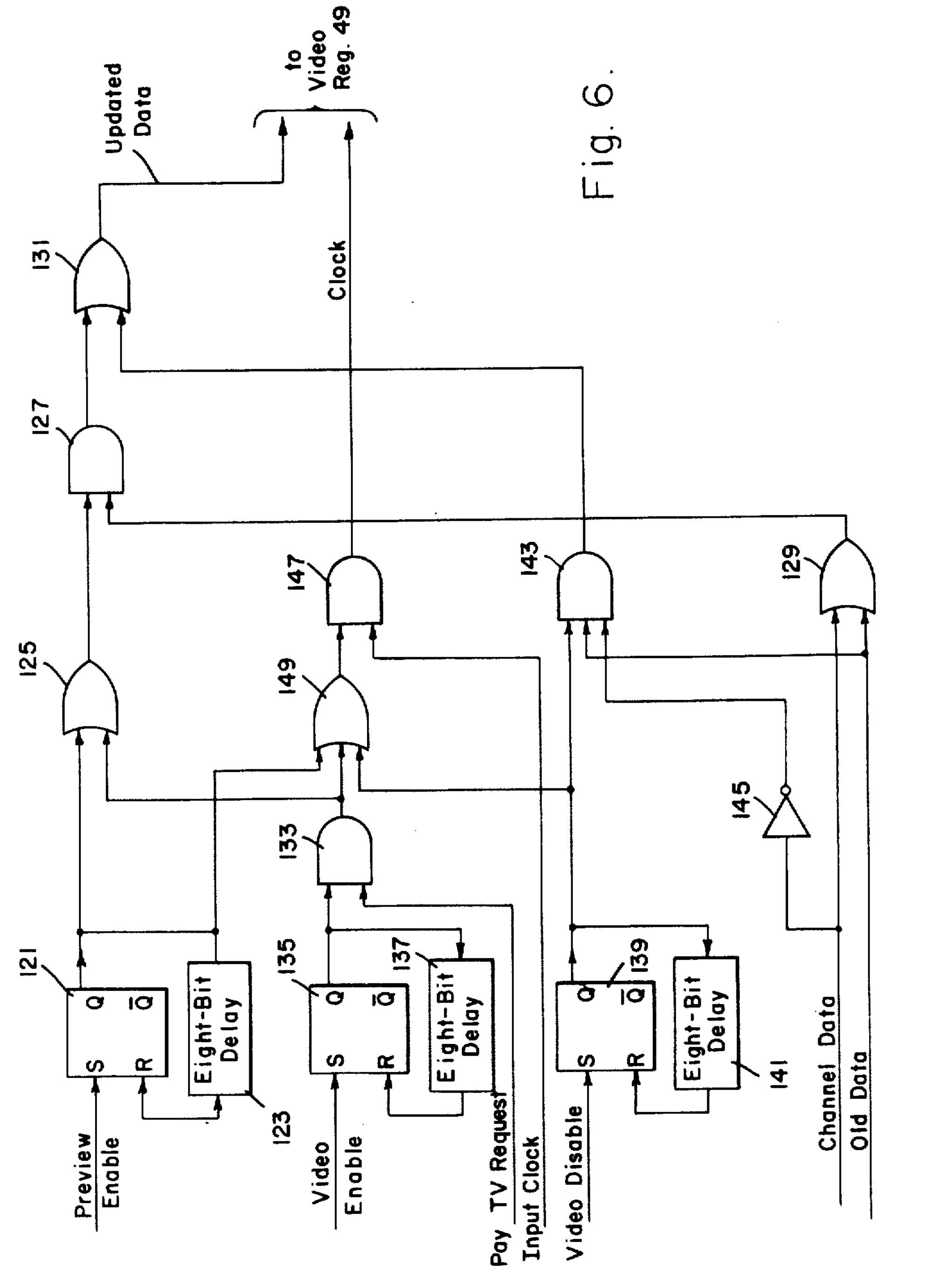
FIG. 6 is a schematic block diagram of the control logic circuit 47 of FIG. 2.

FIG. 6 discloses one mechanization of the control logic 47 (FIG. 2) for accomplishing the above-described operation of the control circuit 31 (FIG. 1) in response to each of the preview enable, video enable and video disable commands. As specified before, each of these commands from the LPC 16 is followed by eight bits of binary information.

A preview enable operation starts with the application of a preview enable command to the set side of an R-S flip-flop 121, causing the Q output of the flip-flop 121 to change to a binary 1. The flip-flop 121 remains in this condition until the 1 has passed through a delay circuit 123, eight bits in length, to reset the flip-flop 121. During the time the flip-flop 121 is in this set condition, the 1 from its Q output is applied through the upper input of an OR gate 125 to the upper input of an AND gate 127. Both of the old data and channel data are applied as inputs to an OR gate 129. As a result, the OR gate 129 will apply a 1 to the lower input of the AND gate 127 whenever either the old data or channel data is in a 1 state, and will apply a 0 to the lower input of the AND gate 127 whenever both of the old data and channel data are in 0 states. The output of the AND gate 127 is applied to the upper input of an OR gate 131. As will be explained more fully later, the lower input of the OR gate 131 is in a 0 state at this time, since no video disable signal is present during this preview enable operation. Therefore, the output of the OR gate 131 will be determined by the output of the OR gate 129 as previously described and in conformance with the teaching of FIG. 4. The output of the OR gate 131 is the updated data that is sequentially applied to the video register 49.

The video enable operation is very similar to the preview enable operation. As previously discussed, when the subscriber depresses the subscription TV request button 43 (FIG. 1), a video enable signal is subsequently sent into the control circuit 31 from the LPC 16. The 1 state pay TV request signal from the flip-flop 91 (FIG. 2) is applied to the lower input of an AND gate 133, while the 1 state video enable signal is applied to a flip-flop 135 and delay circuit 137 combination, which corresponds in structure and operation to the flip-flop 1221 and delay circuit 123 combination previously discussed. The 1 state Q output of the flip-flop 135 is applied to the upper input of the AND gate 133 during the eight bit times of the video enable operation. Since both inputs to the AND gate 133 are binary 1's during the video enable operation, the AND gate 133 will enable the OR gate 125 to develop and apply a 1 to the upper input of the AND gate 127 during the video enable operation. The resultant operation of the AND gate 127 is then controlled by the output of the OR gate 129 in a manner identical to that discussed before in relation to the preview enable operation.

The video disable operation is initiated with the application of the video signal to a flip-flop 139 and delay circuit 141 combination, which corresponds in structure and operation to the flip-flop 121 and delay circuit 123 combination previously discussed. The 1 state Q output of the flip-flop 139 and the old data are respectively applied to two of the inputs of an AND gate 143, while the channel data is inverted by an inverter 145 and applied to the third input of the AND gate 143. The output of the AND gate 143 is applied to the lower input of the OR gate 131. Since there is no preview enable or video enable signal occurring during the video disable operation, the outputs of the OR gate 125 and AND gate 127, and hence the upper input to the gate 131, are all in a 0 state condition. Therefore, the binary state of the updated data at the output of the OR gate 131 is determined by the output state of the AND gate 143. Since the channel data is inverted by the inverter 145, the AND gate 143 will develop a 0 output whenever the channel data is in a 1 state. When the channel data is in a 0 state, the output state of the AND gate 143 will repeat the logical state of old data at that time, as shown in FIG. 5.

As specified earlier, only eight clock pulses are processed after each preview enable, video enable or video disable command. The input clock pulses from the decoder 29 (FIG. 1) are applied to the lower input of an AND gate 147, while the output of an OR gate 149 is applied to the upper input of the AND gate 147. The three inputs to the OR gate 149 are basically controlled by the preview enable, video enable and video disable commands, respectively. The Q outputs of the flip-flops 121 and 139 are respectively applied to two of the inputs of the OR gate 149, while the output of the AND gate 133 is applied to the third input of the OR gate 149. As a consequence, whenever any of these three commands are applied, the OR gate 149 will develop and apply a 1 state signal to the upper input of the AND gate 147 for eight bit times or input clock pulse intervals. With the application of input clock pulses thereto, the AND gate 147 will allow eight clock pulses to pass therethrough to the video register 49 to enable the register 49 to receive and store the eight bits of updated data. Subsequent input clock pulses will be blocked by the AND gate 147 at the termination of the applicable preview enable, video enable or video disable operation.

The invention thus provides a system for controlling CATV program viewing in a plurality of modes of operation. A first mode allows a subscriber to preview a subscription program for a predetermined period without charge. A second mode allows a subscriber to receive a restricted subscription program if he so requests and is eligible to receive it. A third mode allows a subscriber to receive a nonrestricted subscription program if he so requests. A fourth mode allows a subscriber to receive a nonsubscription program if he so desires.

Figure 7:
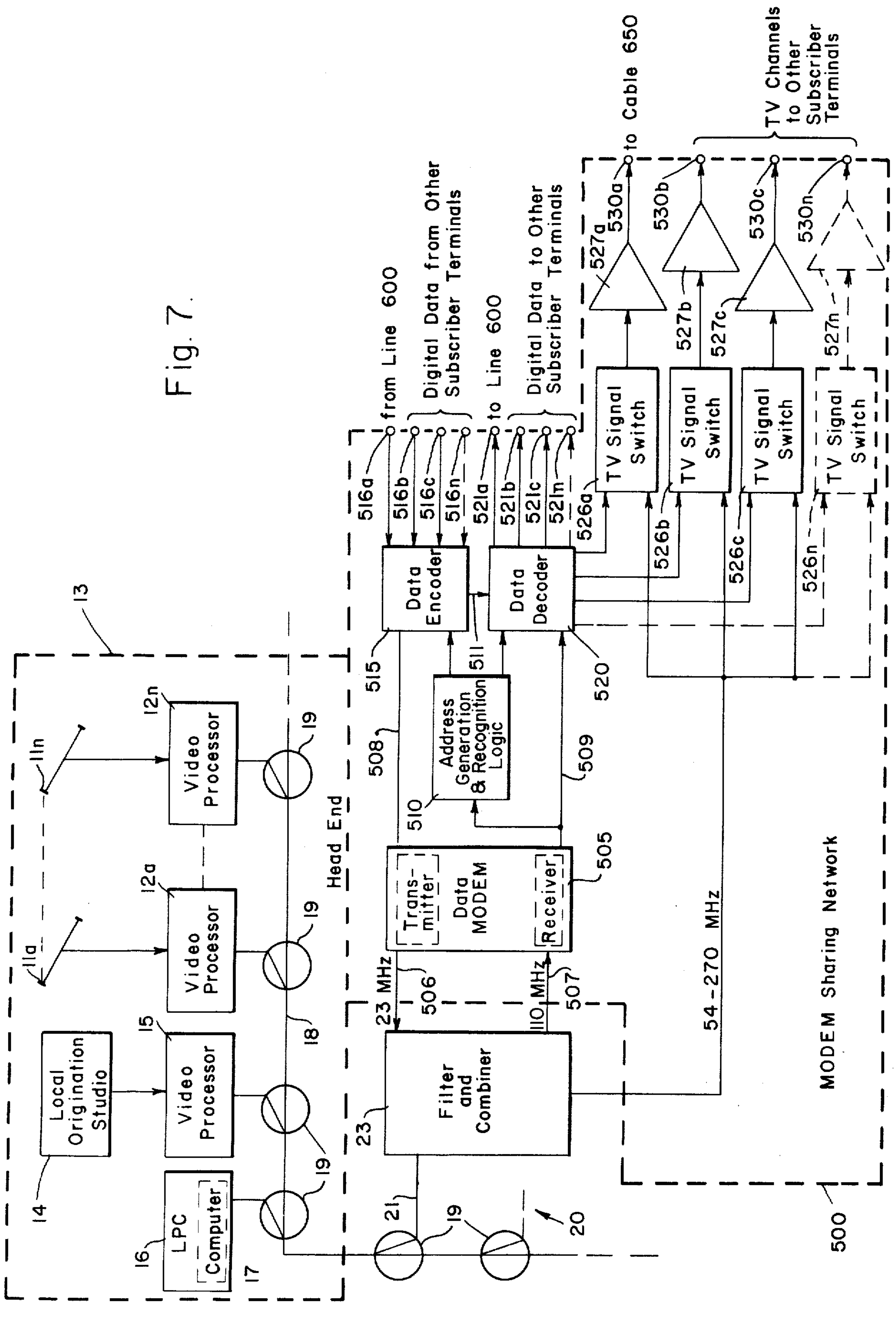
FIG. 7 is a schematic block diagram of a two-way CATV system incorporating the headend of the system interconnected to the cable distribution subsystem which includes the MODEM sharing network.
Figure 8:
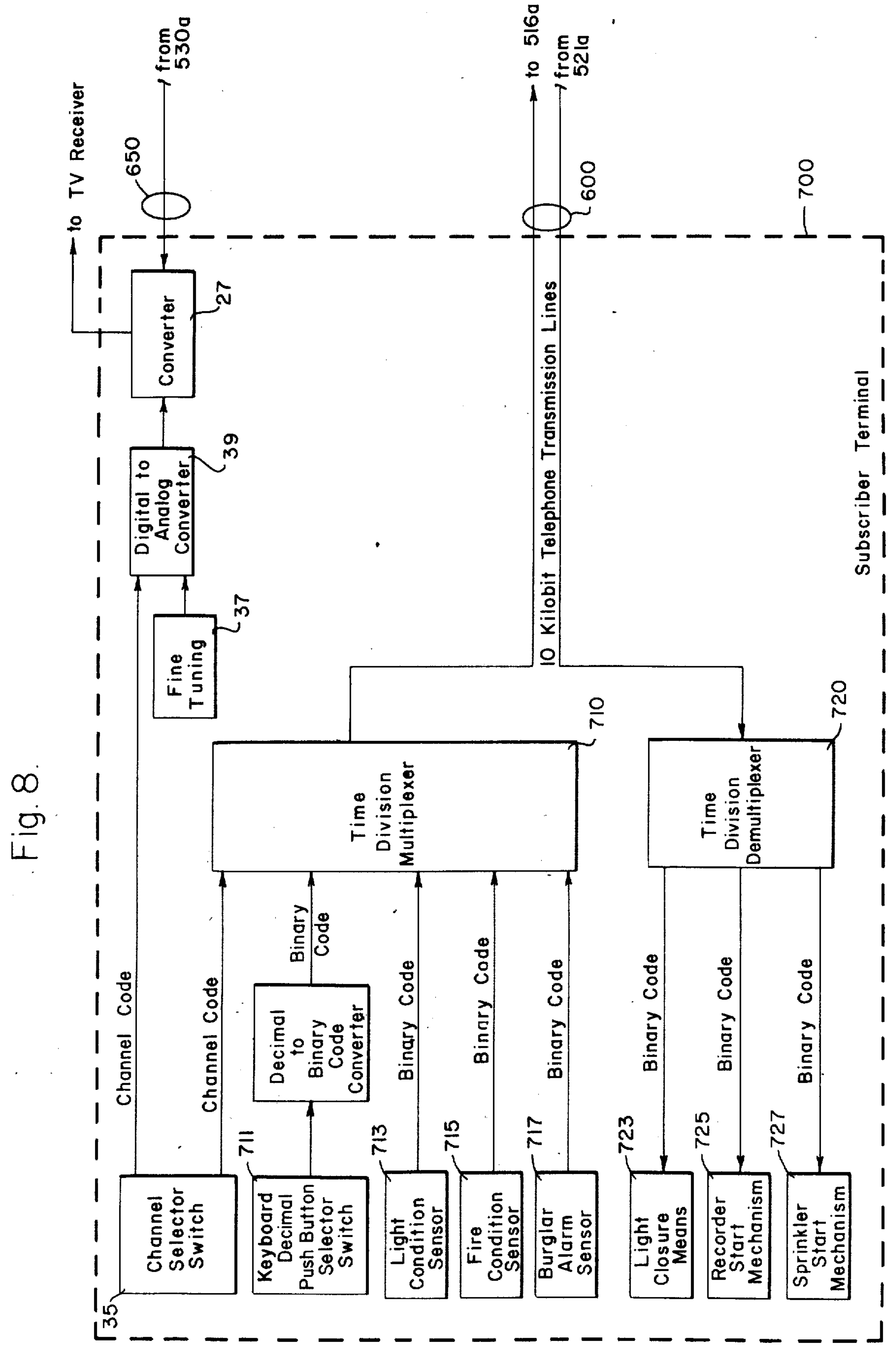
FIG. 8 is a schematic block diagram showing a typical subscriber terminal as used with the MODEM sharing network, and telephone transmission line and coaxial cable interconnecting the MODEM sharing network with the typical subscriber terminal.

Referring to FIGS. 7 and 8, this embodiment employs MODEM (modulator-demodulator) sharing network 500 as an integral portion of cable distribution subsystem 20 hereinabove described.

Appreciation of the cost and system simplicity advantages may be gained by comparison of this system with FIG. 1 configuration. Cost reduction and simplification of subscriber terminals may be appreciated when it is considered that only one MODEM, the most expensive component of the subscriber terminal, need be used to operate a plurality of subscriber terminals similar to subscriber terminal 700. Herein, twelve subscriber terminals have been selected as a practical choice to be controlled by a MODEM sharing network as at 500 although more subscriber terminals may be utilized if the number of data encoders, data decoders and T.V. signal switches are increased accordingly.

The configuration of FIGS. 7 and 8 differs from FIG. 1 configuration in that the data MODEM, previously a portion of means 45 and 29 of FIG. 1, now becomes data MODEM 505, having a phase-shift-keyed 23 MHz signal modulated by a serial digital binary bit stream at 508 in the upstream path, and connected to filter and combiner 23. In the downstream path, a 110 MHz signal is provided through the filter and combiner circuit and demodulated by data MODEM 505. Namely, a frequency shift-keyed-modulated 110 MHz signal is provided at 507 as an input to the receiver portion of MODEM 505. The output of the receiver portion of the MODEM is a serial digital binary bit stream code, provided at 509 as an input to data decoder 520. The filter and combiner 23 is connected to a portion of coaxial cable 21 of cable network 20 through one of a plurality of couplers 19. This connection provides the data and television signal linkage path to the local processing center 16, as hereinabove described in connection with FIG. 1 configuration.

Data encoder 515 is interconnected as at 508 in the upstream data path to data MODEM 505. Data MODEM 505 is connected at 509 in the downstream data path to data decoder 520. Digital data is provided through the 10-kilobit telephone transmission line 600 at terminal 516*a* to data encoder 515, originating from time division multiplexer 710 in subscriber terminal 700. Similarly, other subscriber terminals (not shown) provide similar digital data at terminals 516*b*, 516*c* . . . . . 516*n*, where n may be any whole number, except that generally n will be twelve, for providing a servient relationship of the data MODEM to some twelve subscriber terminals similar to terminal 700. Also, data decoder 520 provides digital data to terminal 521*a* through line 600 to time division demultiplexer 720, and similar digital data is provided at 521*b*, 521*c* . . . 521*n* to a similar demultiplexer in subscriber terminals similar to terminal 700.

Address generation and recognition logic circuitry 510 contains the twelve or more subscriber terminal addresses served by the MODEM sharing network. The address generation portion is injected during any transmissions from any of the serviced subscriber terminals to provide unique identification of the sender terminal address as received by computer 17 of local processing center 16. The address recognition portion of logic circuit 510 detects messages directed to a particular one of the coded subscriber terminals and steers such messages to the appropriate subscriber terminal either via line 600 or through the appropriate TV signal switch means 526*a* . . . 526*n*.

Bypass path 511 is provided between encoder 515 and decoder 520 to allow enabling of switches 526*a* . . . 526*n* in order to enable subscriber TV receivers to receive non-paid television programs. This feature enables bypassing the local processing center in receiving free TV programs. Data MODEM 505 will respond to modulate the encoded data at a 23 MHz rate, the modulated signal being passed upstream through cable 21, couplers 19, and to computer 17 of local processing center 16.

Address recognition logic 510 is triggered by the downstream output of MODEM 505 at 509. Logic means 510 has two outputs, one to data encoder 515 and another to data decoder 520. Data MODEM 505 also provides a downstream output of the serial digital binary bit stream, as above discussed, to decoder 520. Decoder 520 provides serial digital bit signals at terminals 521*a*, 521*b*, 521*c* . . . . 521*n*. Such digital signals are carried by a typical 10-kilobit telephone transmission line, as at 600, to time division demultiplexers such as at 720, for providing commands in a digital binary code to execute such functions at the subscriber terminal as putting on lights by means of light closure switch 723, start recorders by energizing recorder start mechanism 725 and start sprinkler system in cases of fire by energizing sprinkler switch means 727. The output of demultiplexer 720 is in digital binary code, and any binary to decimal converters as are required by means 723, 725 and 727 are integral portions of such means.

In the upstream command path, keyboard 711, consisting of a decimal-type push button selector switch, provides a decimal code to decimal-to-binary converter 712 which in turn provides an output in binary code to time division multiplexer 710. Channel selector switch 35 is the same channel selector switch as discussed in connection with FIG. 1 configuration. The output from switch 35 is the channel code also discussed in connection with FIG. 1, and is in binary form, presented as an input to multiplexer 710. Thus the same channel selection may be made as before by means of switch 35. However, channel selection, as well as other commands, may also be provided through keyboard 711 wherein each channel has assigned a particular digital-decimal code number. Light condition sensor 713, fire condition sensor 715 and burglar alarm detection sensor 717 may be provided with binary code outputs upon sensing the presence of light, fire or detection of burglar alarm condition. Such binary code may be fed to time division multiplexer 710 for upstream communication of these conditions. Output from multiplexer 710 is of course in binary bit form transmitted via transmission line 600 to terminal 516*a* of data encoder 515, and like signals from other subscriber terminals similar to terminals 700 are transmitted via line 600 to terminals 516*b*, 516*c* . . . 516*n*, where n is any whole number but usually is twelve.

Thus it can be seen that data upstream and downstream between a plurality of subscriber terminals can be handled by one MODEM sharing network, the MODEM being shared by a plurality of subscriber terminals.

Insofar as the television signals are concerned, these are transmitted through processing center 16, cable 18, couplers 19, cable 21 into filter and combiner 23. An output of filter and combiner 23 provides a plurality of television channels in the range 54–270 MHz to signal switches, generally of the coaxial or other commonly used high frequency switch types, such as switches 526*a*, 526*b*, 526*c* . . . . 526*n*. Outputs from data decoder 520 are provided respectively as inputs to switches 526*a*, 526*b*, 526*c* . . . . 526*n*. Switches 526*a* . . . 526*n* have respectively in series therewith isolation amplifiers 527*a* . . . . 527*n*, and television signal outputs from amplifiers 527*a* . . . 527*n* are provided respectively at terminals 530*a* . . . 530*n*. Terminal 530*a* is connected by means of coaxial cable 650 to converter 27. Terminals 530*b*, 530*c* . . . . 530*n* are similarly connected by means of a cable similar to cable 650 to their respective converters at their respective subscriber terminals. Both the channel code from switch 35 and output from fine tuning control 37 are provided as inputs to digital-to-analog converter 39, the output of converter 39 being provided as an input to converter 27. The output of converter 27 provides an input to a conventional television receiver at the subscriber terminal. No further discussion of the functions of switch 35, fine tuning control 37, digital-to-analog converter 39 and converter 27 is necessary as same has been discussed in detail in connection with FIG. 1 configuration, above, The benefit of isolation amplifiers 527*a*, 527*b*, 527*c* . . . 527*n* in series with cable 650 is to prevent disabling of a television channel, due to any one subscriber inadvertently short circuiting has transmission line. Thus the other subscribers on the same MODEM will be unaffected by such short circuit.

Figure 9:
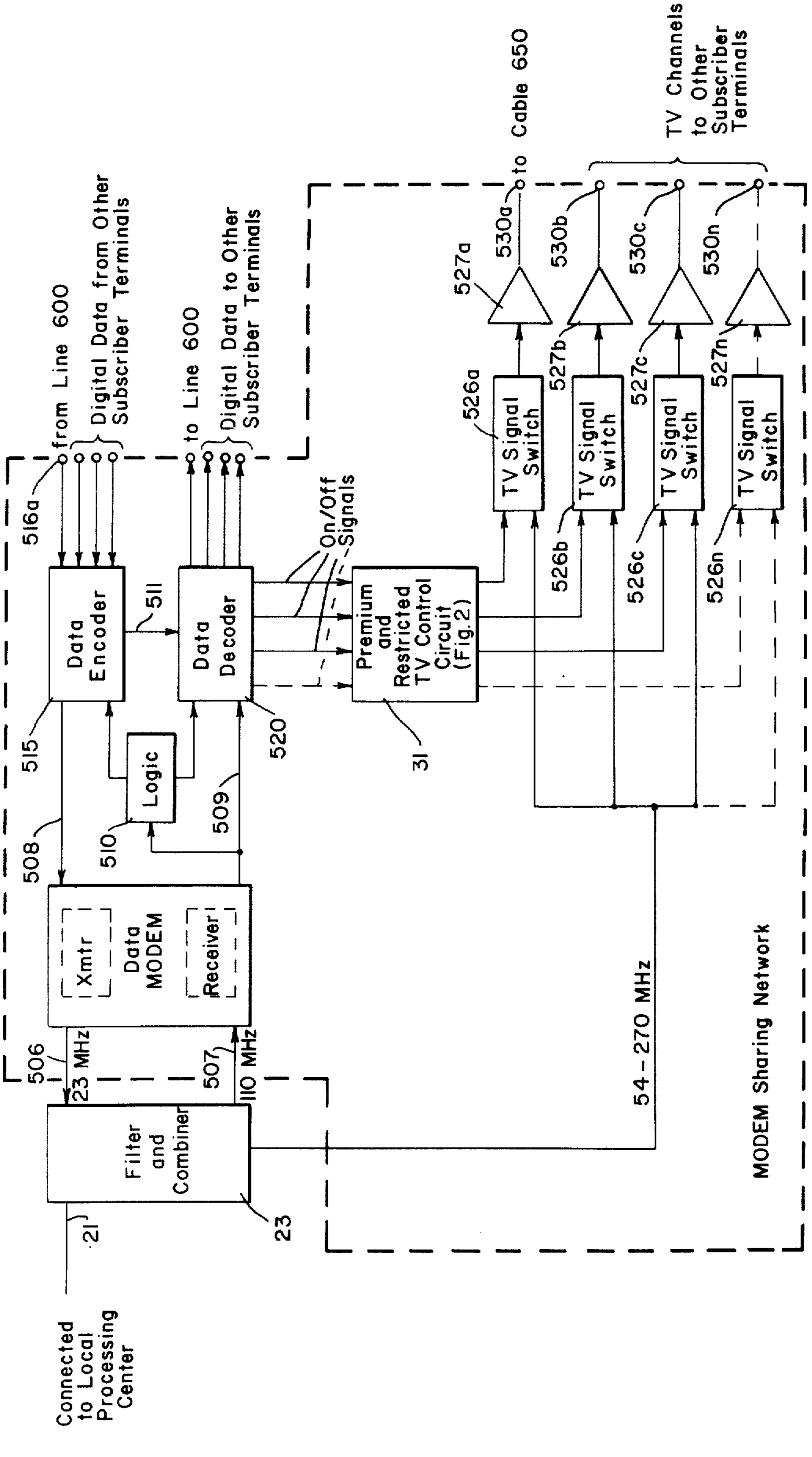
FIG. 9 is a schematic block diagram of the same system as in FIG. 7 except that additionally a premium and restricted TV control circuit has been added thereto.
Figure 10:
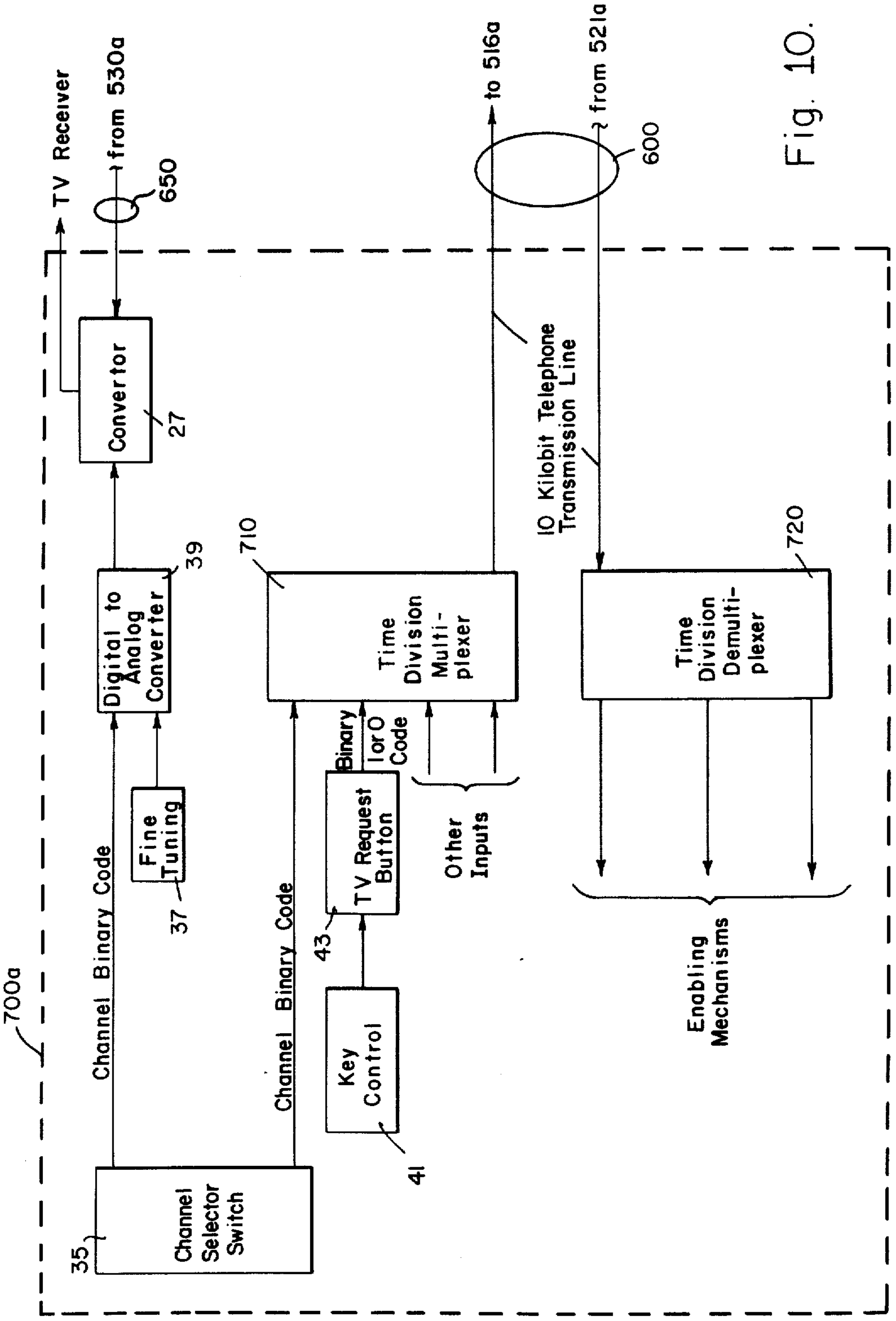
FIG. 10 is a schematic block diagram of the same subscriber terminal as in FIG. 8 except that a key control and subscription TV request button has been added thereto.

The MODEM sharing system is also shown in FIGS. 9 and 10, which comprises MODEM sharing network 500*a*, subscriber terminal 700*a* and cables 600 and 650. Notably, the only difference between MODEM sharing network 500*a* and network 500 of FIG. 7 is that network 500*a* has premium and restricted TV control circuit 31 (same as in FIG. 1) included in series between data decoder 520 and switches 526*a* . . . 526*n*. Likewise, the only difference between subscriber terminal 700*a* and subscriber terminal 700 of FIG. 8 is that key control 41 is provided in series with subscription TV request button 43 as an additional input to multiplexer 710. Except for the time division multiplexing and demultiplexing of coded signals, the on/off signals provided to converter 27 are the same as in FIG. 1 configuration. Such on/off signals are provided as inputs to converter 27 through switches 526*a* . . . 526*n* and cable 650. Inputs of the several preview enable, video enable, video disable, channel data and data signals in the downstream paths are provided by the receiver portion of MODEM 505 through data decoder 520, through line 600 and through demultiplexer 720 to provide various operations at the subscriber terminal. It should be noted that FIG. 2 as previously described in this specification shows details of the logic involved in control circuit 31. Hence, as in FIG. 1 configuration, the configuration of FIGS. 9 and 10, by inclusion of control circuit 31, key control 41 and TV subscription request button 43 will enable the MODEM sharing system to provide the same functions and the four modes of operation as discussed in connection with the configuration of FIG. 1.

What is claimed is:

1. A subscriber type television system having a central television program gathering and processing facility, a plurality of subscriber terminals and a cable distribution subsystem linking the facility with the subscriber terminals, the improvement comprising in combination:

at least one MODEM sharing network as an integral portion of the cable subsystem and interposed between said facility and plurality of subscriber terminals for enabling selection of video programs available at the central television program gathering and processing facility servient to the plurality of said terminals, said at least one MODEM sharing network including a data modulator-demodulator for modulation and demodulation of signals communicated in upstream and downstream paths respectively between the subscriber terminals and the facility; and program control means as an integral portion of said at least one MODEM sharing network for enabling selection of at least one of four modes of operation of said system, said plurality of subscriber terminals each being devoid of capability for enabling selection of said at least one of the four modes of operation of said system and also being devoid of said modulator-demodulator.

2. The invention as stated in claim 1, including:

coaxial cable means for communicating television signals between the MODEM sharing network and the subscriber terminals; and a telephone transmission line for communicating pulses between the MODEM sharing network and the subscriber terminals.

3. The invention as stated in claim 1, wherein the MODEM sharing network includes:

a data encoder in an upstream path to the facility for encoding data communicated from said terminals;

a data decoder in a downstream path to the terminals for decoding data communicated to said terminals; and terminal address recognition logic means responsive to signals from said downstream path for ensuring proper communication between the local processing center and any of said terminals.

4. The invention as stated in claim 3, including a filter and combiner circuit responsive to signals communicated between the facility and any of the terminals.

5. The invention as stated in claim 2, wherein each of the terminals comprises:

a time division multiplexer and demultiplexer connected by means of the telephone transmission line to the MODEM sharing network.

6. The invention as stated in claim 4, including television signal switch means responsive to the filter and combiner and to the data decoder for passing the television signals to a preselected number of the subscriber terminals.

7. The invention as stated in claim 1, wherein said system has a plurality of channels for carrying television programs to the subscriber terminals, and wherein said program control means has means for providing at least one of the following modes of operation consisting of:

first means for providing preview enabling commands to the terminals so as to enable any of said terminals to preview any of the programs for a predetermined period of time free of charge;

second means for providing video enable commands to the particular one of the terminals making demand upon any of the programs restricted for viewing by a particular subscriber class and transmitting the restricted program on a pay basis wherever authorized, or inhibiting transmission of the demanded restricted program if unauthorized to receive same;

third means for providing a video enabling command to the particular one of the terminals making demand for transmission of any of the nonrestricted pay programs and billing the demanding subscriber for the channel selected; and fourth means for providing any of the subscriber terminals access to any of the channels allocated for communication of nonscription television programs for viewing same, free of charge.

8. The invention as stated in claim 7, including:

means for controlling and storing channel enabling data responsive to any one of the first, second and third means so as to enable subscriber switching between the channels carrying the programs purchased without repetition by the subscriber of purchase requests therefor.

* * * * *